US012792196B2

(12) United States Patent
Luo

(10) Patent No.: US 12,792,196 B2
(45) Date of Patent: Nov. 10, 2026

(54) CONTENT SHARING METHOD AND APPARATUS, AND ELECTRONIC DEVICE

(71) Applicant: VIVO MOBILE COMMUNICATION CO., LTD., Dongguan (CN)

(72) Inventor: Bingsong Luo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 257 days.

(21) Appl. No.: 18/605,927

(22) Filed: Mar. 15, 2024

(65) Prior Publication Data

US 2024/0248582 A1 Jul. 25, 2024

Related U.S. Application Data

(63) Continuation of application No. PCT/CN2022/118729, filed on Sep. 14, 2022.

(30) Foreign Application Priority Data

Sep. 18, 2021 (CN) .......................... 202111101490.0

(51) Int. Cl.
*G06F 3/0482* (2013.01)
*G06F 3/04817* (2022.01)
*H04M 1/72439* (2021.01)

(52) U.S. Cl.
CPC ........ *G06F 3/0482* (2013.01); *G06F 3/04817* (2013.01); *H04M 1/72439* (2021.01)

(58) Field of Classification Search
CPC .. G06F 3/0482; G06F 3/04817; G06F 3/0481; G06F 3/04842; G06F 3/0486; H04M 1/72439; H04M 1/7243
See application file for complete search history.

(56) References Cited

U.S. PATENT DOCUMENTS

| | | | | |
|---|---|---|---|---|
| 10,205,778 | B2 | 2/2019 | Qian | |
| 10,708,743 | B2 | 7/2020 | Park et al. | |
| 2018/0088784 | A1* | 3/2018 | Zhu | G06F 3/0484 |
| 2023/0019170 | A1* | 1/2023 | He | G06F 3/04883 |
| 2023/0070358 | A1 | 3/2023 | Du et al. | |

FOREIGN PATENT DOCUMENTS

| | | | | | |
|---|---|---|---|---|---|
| CN | 104660678 | A | | 5/2015 | |
| CN | 106878464 | A | * | 6/2017 | H04L 67/06 |
| CN | 108762954 | A | * | 11/2018 | G06F 9/543 |

(Continued)

*Primary Examiner* — Cao H Nguyen
(74) *Attorney, Agent, or Firm* — The Webb Law Firm

(57) ABSTRACT

A content sharing method includes in a case that first content is displayed, receiving, by a content sharing apparatus, a first input performed on the first content; adding, by the content sharing apparatus, first information corresponding to the first content to a share directory in response to the first input, where the first information is used to indicate the first content; receiving, by the content sharing apparatus, a second input performed on N pieces of target information in M pieces of information in the share directory, where the M pieces of information are used to indicate content in X display interfaces; and sending, by the content sharing apparatus, target content corresponding to the N pieces of target information to a target electronic device in response to the second input.

20 Claims, 6 Drawing Sheets

(56) References Cited

FOREIGN PATENT DOCUMENTS

| | | | |
|---|---|---|---|
| CN | 109491964 | A | 3/2019 |
| CN | 109582475 | A | 4/2019 |
| CN | 110321044 | A | 10/2019 |
| CN | 112911052 | A | 6/2021 |
| CN | 113254409 | A | 8/2021 |
| CN | 113849092 | A | 12/2021 |
| KR | 1020160129635 | A | 11/2016 |

* cited by examiner

CONTENT SHARING METHOD AND APPARATUS, AND ELECTRONIC DEVICE

CROSS-REFERENCE TO RELATED APPLICATIONS

This application is a Bypass Continuation Application of International Patent Application No. PCT/CN2022/118729 filed Sep. 14, 2022, and claims priority to Chinese Patent Application No. 202111101490.0 filed Sep. 18, 2021, the disclosures of which are hereby incorporated by reference in their entireties.

BACKGROUND OF THE INVENTION

Field of the Invention

This application pertains to the field of communications technologies, and specifically relates to a content sharing method and apparatus, and an electronic device.

Description of Related Art

With the development of electronic technologies, it has become incredibly common to share content to other electronic devices anytime and anywhere using electronic devices (such as mobile phones and smart computers).

SUMMARY OF THE INVENTION

According to a first aspect, an embodiment of this application provides a content sharing method. The method includes: in a case that first content is displayed, receiving, by a content sharing apparatus, a first input performed on the first content; adding, by the content sharing apparatus, first information corresponding to the first content to a share directory in response to the first input, where the first information is used to indicate the first content; receiving, by the content sharing apparatus, a second input performed on N pieces of target information in M pieces of information in the share directory, where the M pieces of information are used to indicate content in X display interfaces, X is a positive integer less than or equal to M, M is an integer greater than 1, and N is an integer greater than 1 and less than or equal to M; and sending, by the content sharing apparatus, target content corresponding to the N pieces of target information to a target electronic device in response to the second input.

According to a second aspect, an embodiment of this application provides a content sharing apparatus. The apparatus includes: a receiving module, an adding module, and a sending module. The receiving module is configured to: in a case that first content is displayed, receive a first input performed on the first content. The adding module is configured to add first information corresponding to the first content to a share directory in response to the first input received by the receiving module, where the first information is used to indicate the first content. The receiving module is configured to receive a second input performed on N pieces of target information in M pieces of information in the share directory, where the M pieces of information are used to indicate content in X display interfaces, X is a positive integer less than or equal to M, M is an integer greater than 1, and N is an integer greater than 1 and less than or equal to M. The sending module is configured to send target content corresponding to the N pieces of target information to a target electronic device in response to the second input received by the receiving module.

According to a third aspect, an embodiment of this application provides an electronic device. The electronic device includes a processor, a memory, and a program or an instruction stored in the memory and executable on the processor, where the program or the instruction is executed by the processor to implement steps of the method according to the first aspect.

According to a fourth aspect, an embodiment of this application provides a non-transitory readable storage medium. The non-transitory readable storage medium stores a program or an instruction, and when the program or the instruction is executed by a processor, steps of the method according to the first aspect are implemented.

According to a fifth aspect, an embodiment of this application provides a chip. The chip includes a processor and a communications interface, the communications interface is coupled to the processor, and the processor is configured to run a program or an instruction to implement the method according to the first aspect.

DESCRIPTION OF THE INVENTION

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

At present, a user can share content of different applications or different pages on an electronic device by triggering the electronic device to perform a plurality of sharing operations. It is assumed that an electronic device 1 needs to share content a in an application 1 and content b in an application 2 with an electronic device 2. In this case, the electronic device 1 can first receive an operation of the user to trigger the electronic device 1 to open the application 1 and share the content a in the application 1. After sharing the content with the electronic device 2, the electronic device 1 receives an operation of the user to trigger the electronic device 1 to close the application 1 and open the application 2. Then, the electronic device 1 receives an operation of the user to trigger the electronic device 1 to open the application 2 and share the content b in the application 2. After the electronic device 1 completes sharing the content b with the electronic device 2, all sharing operations at the current time are completed.

As can be learned from the above sharing operations, when the user needs to share content of different applications or different pages on the electronic device, steps corresponding to an entire sharing process are quite cumbersome due to the need to switch a display interface of the electronic device several times, which reduces the efficiency of the user in using the electronic device.

With reference to the accompanying drawings, the content sharing method provided in the embodiments of this application is described in detail by using embodiments and application scenarios thereof.

Figure 1:
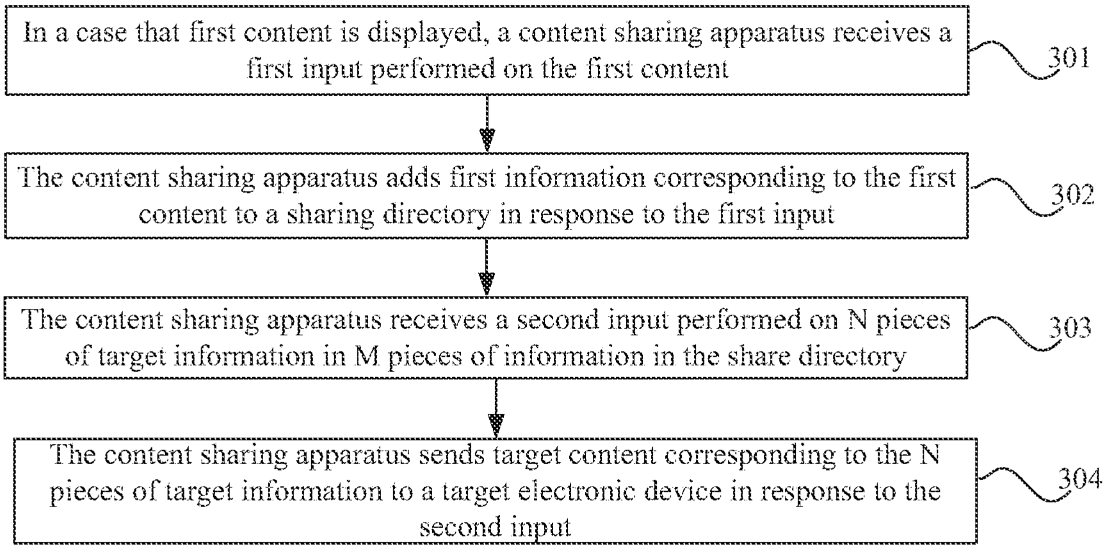
FIG. 1 is a schematic flowchart of a content sharing method according to an embodiment of this application.

An embodiment provides a content sharing method, and as shown in FIG. 1, the content sharing method includes the following step 301 to step 304.

Step 301: in a case that first content is displayed, a content sharing apparatus receives a first input performed on the first content.

In this embodiment of this application, the first content includes page content of at least two pages.

In this embodiment of this application, the first content may be in a form of picture, text, video, audio, including documents and files with different content.

For example, the first content may be content stored on an electronic device. For example, the first content may be a local photo stored by a photo application on the electronic device, or may be a local video stored by a video application on the electronic device, or may be local audio stored by an audio application on the electronic device. The first content may alternatively not be content stored on the electronic device. For example, the first content may be a photo sent by another account in a chat application on the electronic device, or may be audio and video links sent by another account in a chat application on the electronic device, or may be a file or a document sent by another account in a chat application on the electronic device.

In this embodiment of this application, the foregoing one page may include one piece of page content, or may include a plurality of pieces of page content. For example, the one page may include one piece of audio, or may include one piece of audio and one video.

In this embodiment of this application, the first input is used to add information corresponding to the first content to a share directory.

In this embodiment of this application, the first input may be a touch input, for example, a tap input or a drag input, or may be a voice input, or may be a special gesture input, which is not limited in this embodiment of this application.

Step 302: the content sharing apparatus adds first information corresponding to the first content to a share directory in response to the first input.

In this embodiment of this application, the first information is used to indicate the first content, and the first content is page content.

For example, the first information may be the first content, or may be indication information corresponding to the first content.

In this embodiment of this application, in a case that the first information is the indication information corresponding to the first content, if the first content is content stored on the electronic device, the first information may be used to indicate a save path of the first content on the electronic device. If the first content is not the content stored on the electronic device (for example, content on a web page), the first information may be path information used to query the first content, for example, network path information for querying the first content in a network.

Optionally, the first information may be expressed in a form of keyword information, name information, screenshot information, or the like corresponding to the first content, for example, picture icon information or text icon information.

In this embodiment of this application, one piece of first information corresponds to one piece of page content.

In this embodiment of this application, the share directory may be used to display the first information.

Step 303: the content sharing apparatus receives a second input performed on N pieces of target information in M pieces of information in the share directory.

In this embodiment of this application, the M pieces of information are used to indicate content in X display interfaces, M is an integer greater than 1, X is a positive integer less than or equal to M, and N is an integer greater than 1 and less than or equal to M.

In this embodiment of this application, the M pieces of information may be arranged and displayed in the share directory in a form of a list. The M pieces of information may be sorted in the share directory in an order in which the M pieces of information are added. In other words, an order in which the M pieces of information are arranged corresponds to the order in which the M pieces of information are added to the share directory.

It can be understood that the share directory may be triggered to be displayed after the content sharing apparatus receives the first input, or may be triggered to be displayed after the second input is received, or may be continuously displayed floating in the display interface. This is not limited in this embodiment of this application.

In this embodiment of this application, the second input may be used to determine information that a user wants to send to a target account, that is, the N pieces of target information.

In this embodiment of this application, the second input may be a touch input, for example, a tap input or a drag input, or may be a voice input, or may be a special gesture input, which is not limited in this embodiment of this application.

Step 304: the content sharing apparatus sends target content corresponding to the N pieces of target information to a target electronic device in response to the second input.

In this embodiment of this application, the target information may be used to indicate target content displayed on the electronic device.

In an example, when the target electronic device transmits the target content through a mobile data network, the target electronic device may be an electronic device corresponding to the target account.

In this embodiment of this application, the target content may be page content that the user of the electronic device wants to share with the target electronic device, that is, the target content is content viewed by the user on a page of the electronic device.

In an example, when the target information is used to indicate a save path of locally stored target content, in a case that the user sends the target information content, the target information is used to trigger the electronic device to invoke the locally stored target content and send the target content to the target electronic device.

In an example, when the target information is used to indicate path information of non-locally stored target content, in a case that the user sends the target information content, the target information is used to trigger the electronic device to invoke the target content corresponding to the path information and send the target content to the target electronic device. For example, when the target content is online video content and the target information is network path information for querying the online video, the network path information is used to trigger the electronic device to acquire the online video content and send the online video content to the target electronic device.

In this embodiment of this application, the target account may be predefined or may be user-defined.

In an example, when the target account is predefined, the target account may be a target account in a preset target application.

In an example, when the target account is user-defined, the target account may be selected by the user from a displayed account list after the content sharing apparatus receives a third input of the user.

Optionally, in this embodiment of this application, before step 302, the content sharing method provided by this embodiment of this application may further include the following step A1 and step A2:

Step A1: the content sharing apparatus receives a second input from a user.

Step A2: the content sharing apparatus displays the share directory in response to the second input.

In this embodiment of this application, the second input is used to invoke the share directory.

In this embodiment of this application, the second input may be a touch input, for example, a tap input or a drag input, or may be a voice input, or may be a special gesture input, which is not limited in this embodiment of this application.

In this embodiment of this application, the share directory may be directly invoked from a page corresponding to the first content.

In an example, a first page may include an invoking control for invoking the share directory. After the content sharing apparatus receives the second input performed by the user on the invoking control, the content sharing apparatus is triggered to display the share directory.

Example 1: as shown in FIG. 2, it is assumed that the first content includes audio content 32 on f a first page 31 and video content 34 on a second page 33. Then, as shown in FIG. 2A, a touch-and-hold input (that is, the foregoing first input) performed by the user on the audio content 32 on the first page 31 is received, and the electronic device is triggered to display a sharing operation list 35. At this time, the electronic device receives a tap input performed by the user on a “share later control” in the sharing operation list 35. As shown in FIG. 2B, the electronic device stores information corresponding to the audio content 32 in the share directory. Similarly, after the electronic device receives a switching input of the user for switching from the first page to the second page 33, as shown in FIG. 2C, a touch-and-hold input (that is, the foregoing first input) performed by the user on the video content 34 on the second page 33 is received, and the electronic device is triggered to display the sharing operation list 35. At this time, as shown in FIG. 2D, the electronic device receives a tap input performed by the user on the “share later control” in the sharing operation list 35, and the electronic device stores information corresponding to the video content 34 in the share directory.

Figure 2A:
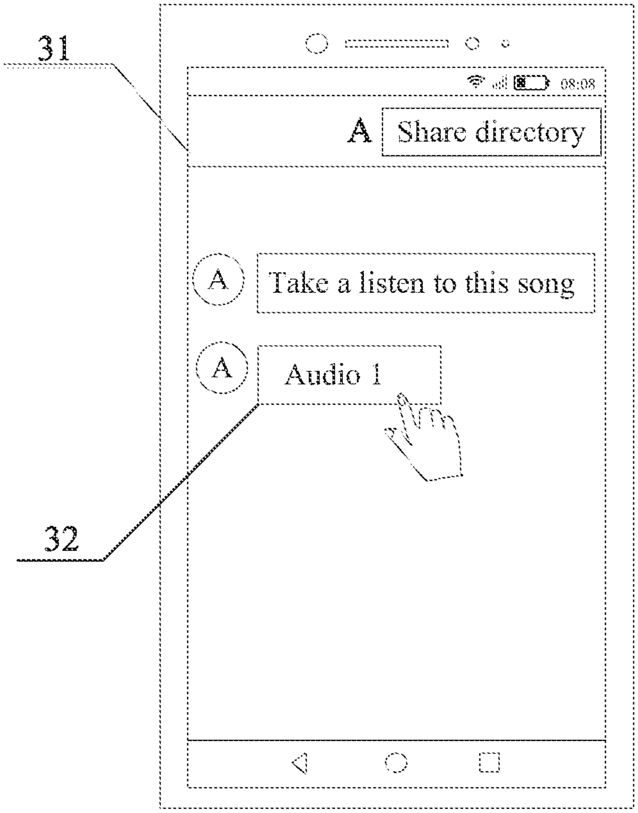
FIG. 2A is a first schematic diagram of an interface to which a content sharing method is applied according to an embodiment of this application.
Figure 2B:
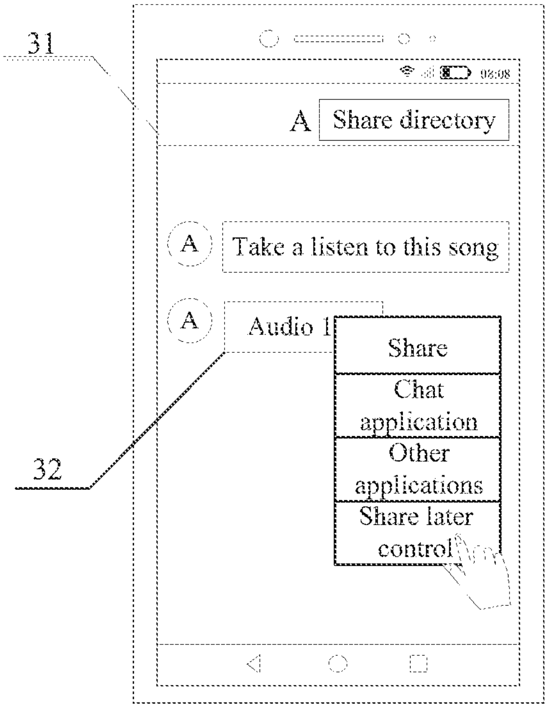
FIG. 2B is a second schematic diagram of an interface to which a content sharing method is applied according to an embodiment of this application.
Figure 2C:
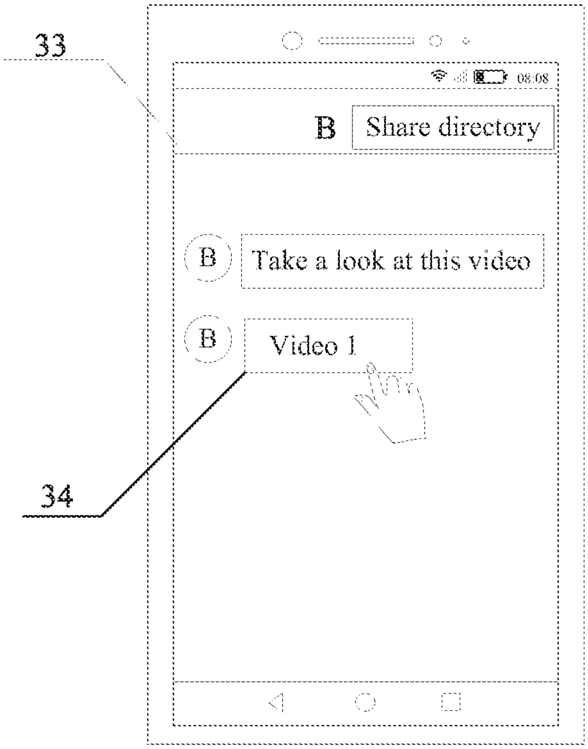
FIG. 2C is a third schematic diagram of an interface to which a content sharing method is applied according to an embodiment of this application.
Figure 2D:
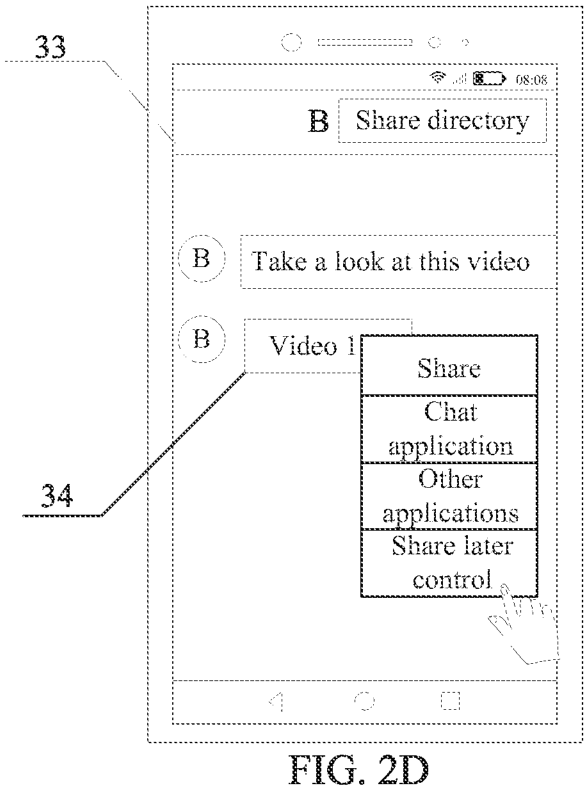
FIG. 2D is a fourth schematic diagram of an interface to which a content sharing method is applied according to an embodiment of this application.
Figure 2E:
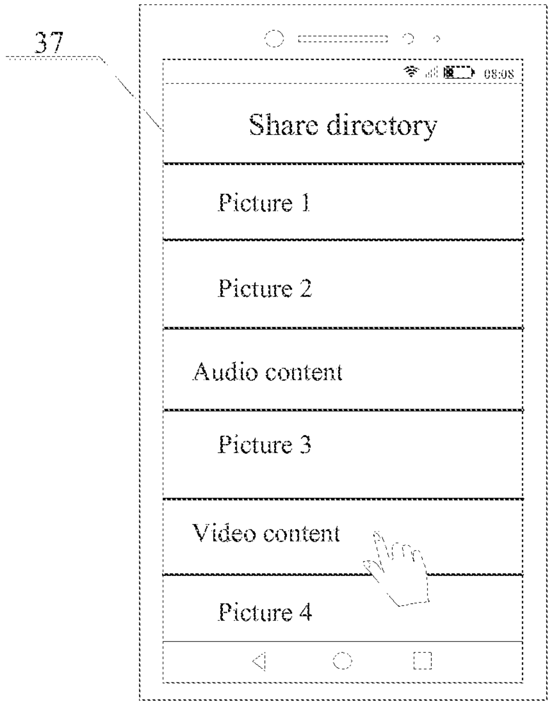
FIG. 2E is a fifth schematic diagram of an interface to which a content sharing method is applied according to an embodiment of this application.

Then, the electronic device receives a tap input (that is, the foregoing third input) performed by the user on a share directory control 36 on the second page 33, and displays the share directory 37, as shown in FIG. 2E. After receiving a select input (that is, the foregoing second input) performed by the user on the information corresponding to the audio content 32 and the information corresponding to the video content 34 in six pieces of information in the share directory 37, the electronic device sends the audio content 32 and video content 34 to a preset target account.

In this embodiment of this application, in a case that the content sharing apparatus displays interface content of different interfaces, after receiving the first input performed by the user on page content of different pages, the electronic device adds the page content of different pages to the share directory, then receives the second input performed by the user on the N pieces of target information in the M pieces of information in the share directory, and sends the target content corresponding to the N pieces of target information to the target electronic device. In this way, in a case that the user needs to send interface content of different interfaces to the target electronic device, the content that needs to be shared can be shared with the target electronic device at once using the share directory. This avoids cumbersome steps caused by switching between different pages, simplifies operation steps, and improves the efficiency of the user in using the electronic device.

Optionally, in this embodiment of this application, for the adding information corresponding to the first content to the share directory in step 302, the content sharing method provided by this embodiment of this application may include the following step B:

Step B: in a case that a share icon is displayed, the content sharing apparatus adds the first information corresponding to the first content to the share directory indicated by the share icon.

For example, the share icon is displayed floating on a display interface corresponding to the first content.

In an example, the share icon may be a three-dimensional control, and the three-dimensional control may be in various shapes, for example, in a shape of a sphere or a polyhedron.

It can be understood that because the share icon is displayed floating on the display interface corresponding to the first content, a display position of the share icon is constantly updated based on an input of a user. For example, after the share icon receives a drag input of the user, the display position of the share icon is switched from the top of the display interface to the bottom of the display interface.

In an example, the content sharing apparatus may receive a moving input performed by a user on a content icon of the first content, so that a display area corresponding to the content icon of the first content coincides with a display area of the share icon, thereby triggering the electronic device to add information about the first content to the share directory.

Figure 3A:
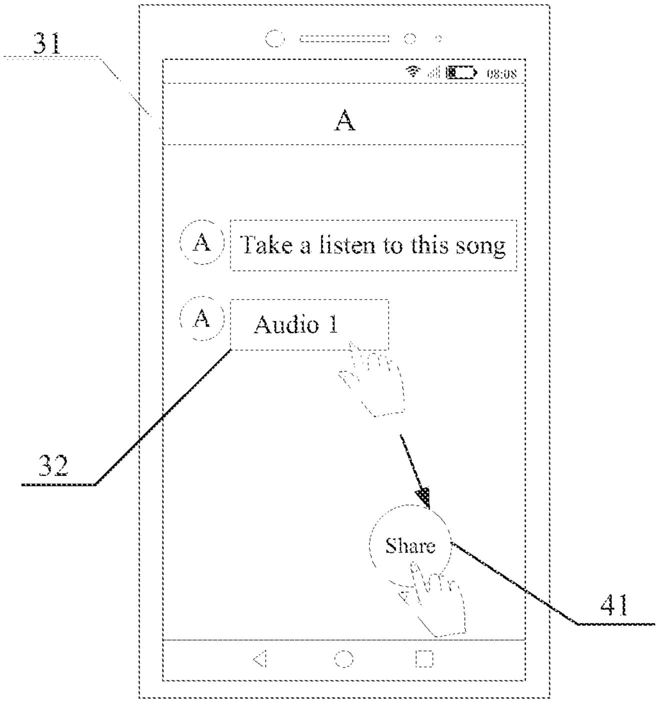
FIG. 3A is a sixth schematic diagram of an interface to which a content sharing method is applied according to an embodiment of this application.

Example 2: with reference to example 1, as shown in FIG. 3A, a spherical three-dimensional control 41 (share icon) is displayed floating on the first page 31. The spherical three-dimensional control is used to indicate the share directory. After a drag input performed by the user on the audio content 32 on the first page 31 is received, an icon corresponding to the audio content 32 is moved to an area in which the three-dimensional control 41 is located. After the drag input is finished, the content information corresponding to the audio content 32 is stored in the share directory. Similarly, a spherical three-dimensional control 41 is also displayed floating on the second page 33. After a drag input performed by the user on the video content 34 on the second page 33 is received, an icon corresponding to the video content 34 is moved to an area in which the three-dimensional control 41 is located. After the drag input is finished, the content information corresponding to the video content 34 is stored in the share directory.

In this way, the electronic device can simply and conveniently store the content to be shared in the share directory using the share icon displayed floating on the display interface, thereby reducing operating steps.

Optionally, in this embodiment of this application, before step 303, the content sharing method provided by this embodiment of this application may include the following step C1 and step C2:

Step C1: the content sharing apparatus receives a third input performed on the first information in the share directory.

Step C2: the content sharing apparatus performs an editing operation on the first information in response to the third input.

For example, the first information is any one of the foregoing M pieces of information.

For example, the editing operation is one of the following: adjusting an order in which the first information is arranged in the share directory, or deleting the first information.

For example, the third input is used to perform an editing operation on any information in the share directory.

For example, the third input may be a touch input, for example, a tap input or a drag input, or may be a voice input, or may be a special gesture input, which is not limited in this embodiment of this application.

Figure 4:
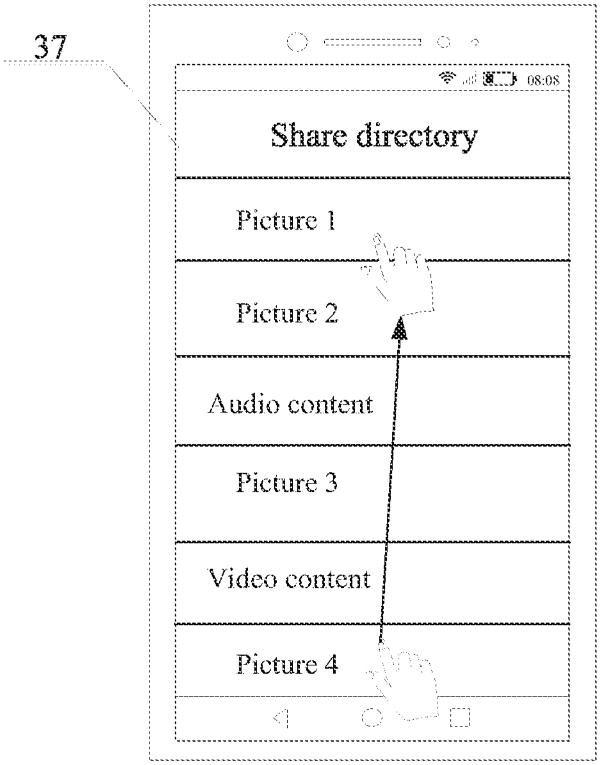
FIG. 4 is an eighth schematic diagram of an interface to which a content sharing method is applied according to an embodiment of this application.

Example 3: with reference to example 1, as shown in FIG. 4, there are six pieces of information in the share directory 37. After a drag input (that is, the foregoing third input) performed by the user on picture 4 in the six pieces of information in the share directory 37 is received, a display order of picture 4 may be adjusted to the first position in the share directory (that is, the foregoing editing operation).

In this way, the electronic device can receive an editing operation performed by the user on the share directory, to conveniently organize information in the share directory.

Optionally, in this embodiment of this application, for the sending target content corresponding to the N pieces of target information to the target electronic device in step 304, the content sharing method provided by this embodiment of this application may include the following step D1 and step D2:

Step D1: the content sharing apparatus combines the N pieces of target information to generate a share subdirectory.

Step D2: the content sharing apparatus sends the share subdirectory to the target electronic device.

For example, the share subdirectory includes the N pieces of target information.

In an example, the share subdirectory may be a subdirectory included in the share directory.

For example, the share directory may include a subdirectory icon used to indicate the share subdirectory.

It can be understood that after the electronic device receives an input performed by the user on the subdirectory icon, information in the subdirectory can be displayed.

For example, after receiving the third input performed by the user on the N pieces of target information, the content sharing apparatus combines the N pieces of target information.

For example, different information in the share subdirectory is used to indicate different pieces of page content.

Optionally, in this embodiment of this application, if the first content is content sent by a first electronic device, before step 301, the content sharing method provided by this embodiment of this application further includes the following step E1 and step E2:

Step E1: the content sharing apparatus receives a fourth input performed on the first content.

Step E2: the content sharing apparatus adds the first content to a target favorites folder in response to the fourth input.

For example, the target favorites folder is any favorites folder in Y favorites folders on the electronic device or a new favorites folder, the Y favorites folders correspond to Y themes, and Y is a positive integer.

Optionally, based on step E1 and step E2, in step 301, the content sharing method provided by this embodiment of this application may include the following step E3:

Step E3: The content sharing apparatus receives the first input performed on the first content in the target favorites folder.

For example, the first content may be content sent by the first electronic device browsed by the user of the electronic device in a session interface with the first electronic device.

For example, the foregoing fourth input is used to add the first content to the target favorites folder.

For example, the fourth input may be a touch input, for example, a tap input or a drag input, or may be a voice control input, or may be a special gesture input, which is not limited in this embodiment of this application.

For example, the foregoing Y favorites folders may be preset favorites folders on the electronic device, or may be user-defined favorites folders.

For example, different favorites folders correspond to different themes, such as food, photography, and learning.

In an example, when the target favorites folders is any one of the Y favorites folders, a theme of the target favorites folder can be displayed on favorites folder icons corresponding to the Y favorites folders, so that the user can select a desired favorites folder.

In another example, when the target favorites folder is a new favorites folder, the electronic device may receive an operation of the user of creating a new favorites folder, and add the first content to a favorites folder other than the Y existing favorites folders on the electronic device. Optionally, the electronic device can set a theme for the new favorites folder by receiving an operation of a user.

In this way, when the user browses content sent by another electronic device, the user can add the content to the target favorites folder of the target theme, and can find the target favorites folder of the target theme in the need of sharing the content subsequently. This makes content invoking and sharing convenient, without returning to a session page with the first electronic device.

Optionally, in this embodiment of this application, after step 304, the content sharing method provided by this embodiment of this application further includes the following step F:

Step F: the content sharing apparatus performs a target operation on the N pieces of target information in the share directory.

For example, the target operation is one of the following: removing the N pieces of target information from the share directory, or retaining the N pieces of target information in the share directory.

In this way, after finishing sharing the target information, the content sharing apparatus can receive the target operation based on a requirement of the user to perform a retaining or deleting operation on the target information, thereby organizing the share directory in a timely manner.

Optionally, in this embodiment of this application, before step 301, the content sharing method provided by this embodiment of this application may include the following step G1 and step G2:

Step G1: the content sharing apparatus receives a fifth input performed by a user.

Step G2: the content sharing apparatus activates a sharing indication function in response to the fifth input.

For example, the sharing indication function is used to trigger the electronic device to display the share icon in a floating manner in the display interface.

For example, the fifth input may be used to trigger the electronic device to activate the sharing indication function.

For example, the fifth input may be a touch input, for example, a tap input or a drag input, or may be a voice input, or may be a special gesture input, which is not limited in this embodiment of this application.

For example, the sharing indication function may be a function in system settings of the electronic device.

Optionally, the sharing indication function may be activated in a system settings application of the electronic device, or may be activated in a preset specific manner, for example, double-tapping a volume up button.

In an example, after the electronic device activates the sharing indication function, the electronic device activates the share directory so that the user can directly store the content to be shared in the share directory.

In another example, after the electronic device activates the sharing indication function, the share icon is displayed floating in the display interface, so that the user can store the content to be shared in the share directory through the share icon.

In this way, the electronic device can start sharing, by activating the sharing indication function, the share directory for storing multi-page content, so that the user does not need to switch pages during a subsequent sharing process, which simplifies operation steps and improves the efficiency of the user in operating the electronic device.

Optionally, in this embodiment of this application, in step B, the content sharing method provided by this embodiment of this application may include the following step H1 and step H2:

Step H1: the content sharing apparatus receives a sixth input performed on the share icon.

Based on step H1, in step 304, the content sharing method provided by this embodiment of this application may include the following step H2:

Step H2: in response to the sixth input, the content sharing apparatus triggers the electronic device to invoke the share directory indicated by the share icon and displays the share directory.

For example, the foregoing second input may also be used to invoke the share directory indicated by the share icon.

Figure 3B:
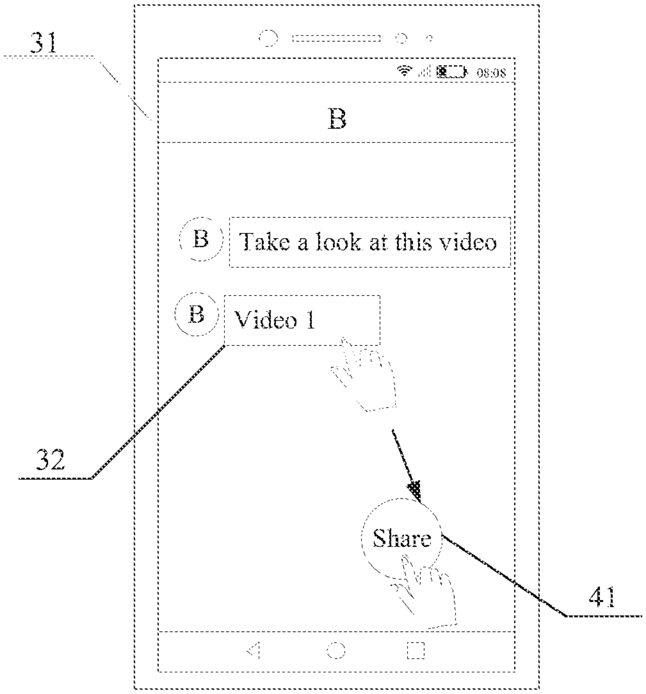
FIG. 3B is a seventh schematic diagram of an interface to which a content sharing method is applied according to an embodiment of this application.

Example 4: as shown in FIG. 3B, after receiving a touch-and-hold input performed by the user on the spherical three-dimensional control 41, the electronic device automatically displays the share directory 37.

In this way, the electronic device can simply and conveniently invoke the share directory using the share icon displayed floating on the display interface, thereby reducing operating steps.

It should be noted that the content sharing method provided in the embodiments of this application may be performed by a content sharing apparatus, or a control module that is in the content sharing apparatus and that is configured to perform the content sharing method. In the embodiments of this application, that the content sharing apparatus performs the content sharing method is used as an example to describe the content sharing apparatus provided in the embodiments of this application.

Figure 5:
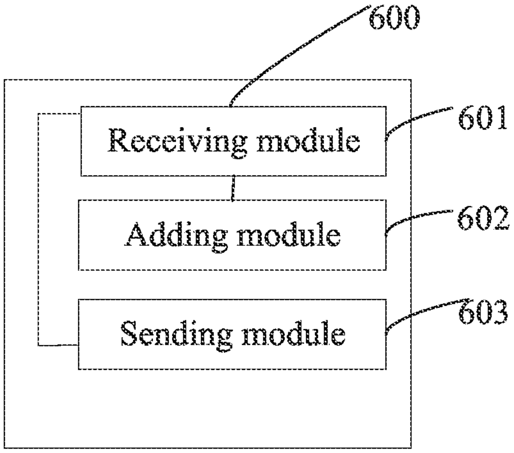
FIG. 5 is a schematic diagram of a structure of a content sharing apparatus according to an embodiment of this application.

FIG. 5 is a schematic diagram of a possible structure of a content sharing apparatus according to an embodiment of this application. As shown in FIG. 5, the apparatus 600 includes: a receiving module 601, an adding module 602, and a sending module 603. The receiving module 601 is configured to: in a case that first content is displayed, receive a first input performed on the first content. The adding module 602 is configured to add first information corresponding to the first content to a share directory in response to the first input received by the receiving module 601, where the first information is used to indicate the first content. The receiving module 601 is configured to receive a second input performed on N pieces of target information in M pieces of information in the share directory, where the M pieces of information are used to indicate content in X display interfaces, X is a positive integer less than or equal to M, M is an integer greater than 1, and N is an integer greater than 1 and less than or equal to M. The sending module 603 is configured to send target content corresponding to the N pieces of target information to a target electronic device in response to the second input received by the receiving module 601.

In the content sharing apparatus provided by this embodiment of this application, in a case that the content sharing apparatus displays interface content of different interfaces, after receiving the first input performed by the user on page content of different pages, the electronic device adds the page content of different pages to the share directory, then receives the second input performed by the user on the N pieces of target information in the M pieces of information in the share directory, and sends the target content corresponding to the N pieces of target information to the target electronic device. In this way, in a case that the user needs to send interface content of different interfaces to the target electronic device, the content that needs to be shared can be shared with the target electronic device at once using the share directory. This avoids cumbersome steps caused by switching between different pages, simplifies operation steps, and improves the efficiency of the user in using the electronic device.

Optionally, in this embodiment of this application, the adding module is configured to: in a case that a share icon is displayed, add the first information corresponding to the first content to the share directory indicated by the share icon, where the share icon is used to indicate the share directory, and the share icon is displayed floating on a display interface corresponding to the first content.

Optionally, in this embodiment of this application, the apparatus 600 further includes an editing module 604. The receiving module 601 is further configured to receive a third input performed on the first information in the share directory, where the first information is any one of the M pieces of information. The editing module 604 is further configured to perform an editing operation on the first information in response to the third input received by the receiving module 601, where the editing operation is one of the following: adjusting an order in which the first information is arranged in the share directory, or deleting the first information.

Optionally, in this embodiment of this application, the apparatus 600 includes a generating module 605. The generating module 605 is configured to combine the N pieces of target information to generate a share subdirectory, where the share subdirectory includes the N pieces of target information. The sending module 603 is configured to send the share subdirectory generated by the generating module 605 to the target electronic device.

Optionally, in this embodiment of this application, the apparatus further includes: an execution module 606. The receiving module 601 is further configured to receive a fourth input performed on the first content. The execution module 606 is further configured to add the first content to a target favorites folder in response to the fourth input received by the receiving module 601. The target favorites folder is any favorites folder in Y favorites folders in the electronic device or a new favorites folder, the Y favorites folders correspond to Y themes, and Y is a positive integer. The receiving module 601 is configured to receive the first input performed on the first content in the target favorites folder.

Optionally, in this embodiment of this application, the apparatus 600 further includes an execution module 606. The execution module 606 is configured to perform a target operation on the N pieces of target information in the share directory. The target operation is one of the following: removing the N pieces of target information from the share directory, or retaining the N pieces of target information in the share directory.

The content sharing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in the embodiments of this application.

The content sharing apparatus in this embodiment of this application may be an apparatus with an operating system. The operating system may be an Android operating system, an iOS operating system, or another possible operating system, which is not specifically limited in the embodiments of this application.

The content sharing apparatus provided in this embodiment of this application can implement the processes implemented in the method embodiments in FIG. 1 to FIG. 4. To avoid repetition, details are not described herein again.

Figure 6:
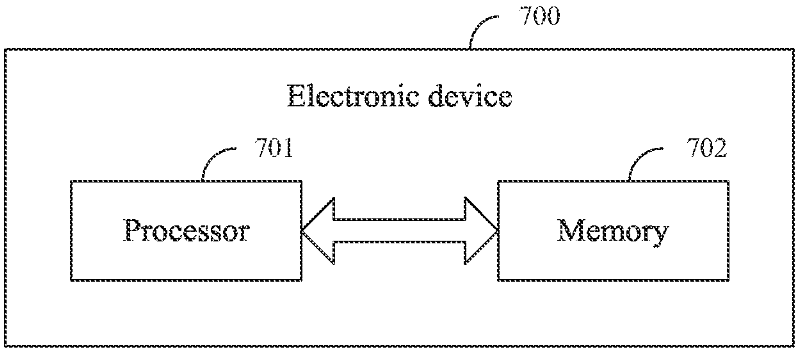
FIG. 6 is a first schematic diagram of a structure of an electronic device according to an embodiment of this application.

Optionally, as shown in FIG. 6, an embodiment of this application further provides an electronic device 700, including a processor 701, a memory 702, and a program or an instruction stored in the memory 702 and executable on the processor 701. When the program or the instruction is executed by the processor 701, processes of the foregoing content sharing method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 7:
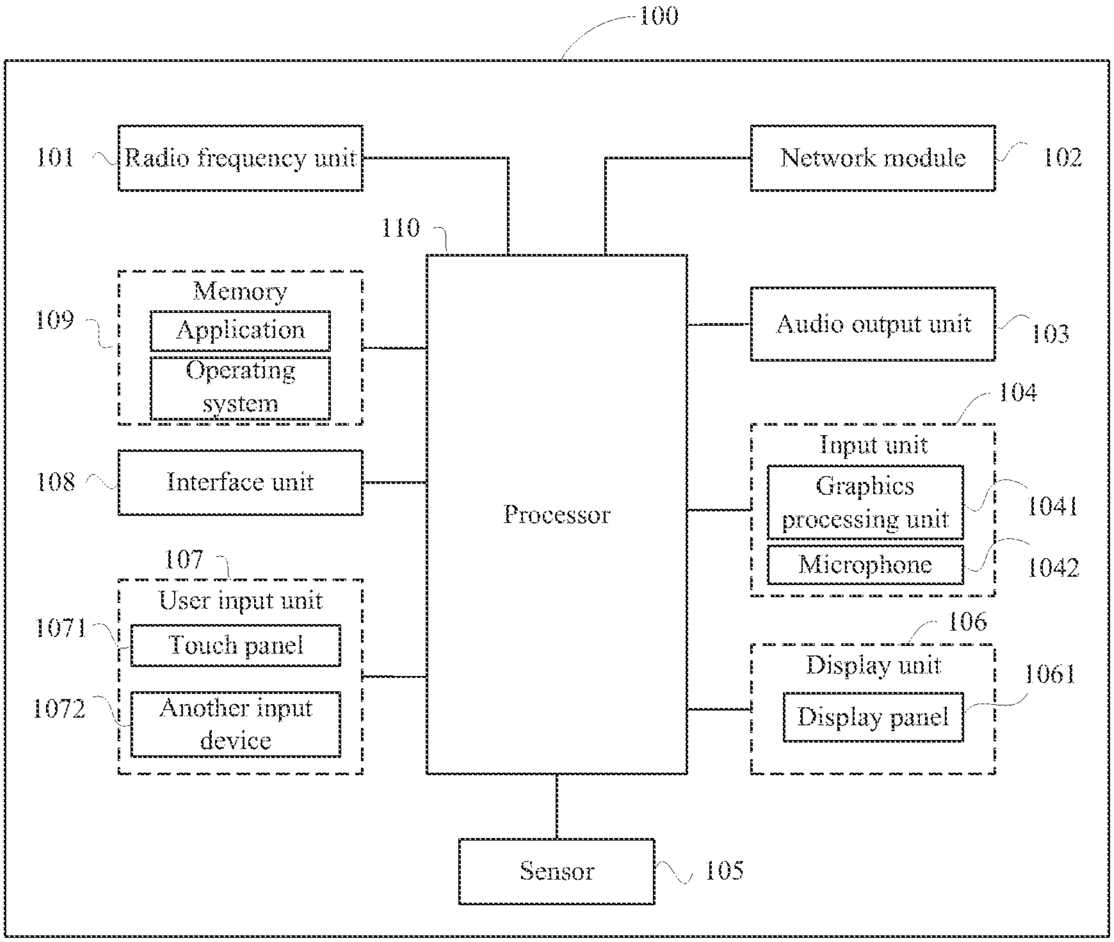
FIG. 7 is a second schematic diagram of a structure of an electronic device according to an embodiment of this application.

FIG. 7 is a schematic diagram of a hardware structure of an electronic device according to an embodiment of this application.

An electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (such as a battery) that supplies power to each component. The power supply may be logically connected to the processor 110 by using a power supply management system, to implement functions such as charging and discharging management, and power consumption management by using the power supply management system. The electronic device is not limited to the electronic device structure shown in FIG. 7. The electronic device may include more or fewer components than those shown in the figure, or combine some components, or have a different component arrangement. Details are not described herein.

The user input unit 107 is configured to: in a case that first content is displayed, receive a first input performed on the first content. The processor 110 is configured to add first information corresponding to the first content to a share directory in response to the first input received by the user input unit 107, where the first information is used to indicate the first content. The user input unit 107 is configured to receive a second input performed on N pieces of target information in M pieces of information in the share directory, where the M pieces of information are used to indicate content in X display interfaces, X is a positive integer less than or equal to M, M is an integer greater than 1, and N is an integer greater than 1 and less than or equal to M. The radio frequency unit 101 is configured to send target content corresponding to the N pieces of target information to a target electronic device in response to the second input received by the user input unit 107.

In a case that the electronic device provided by this embodiment of this application displays interface content of different interfaces, after receiving the first input performed by the user on page content of different pages, the electronic device adds the page content of different pages to the share directory, then receives the second input performed by the user on the N pieces of target information in the M pieces of information in the share directory, and sends the target content corresponding to the N pieces of target information to the target electronic device. In this way, in a case that the user needs to send interface content of different interfaces to the target electronic device, the content that needs to be shared can be shared with the target electronic device at once using the share directory. This avoids cumbersome steps caused by switching between different pages, simplifies operation steps, and improves the efficiency of the user in using the electronic device.

Optionally, in this embodiment of this application, the processor 110 is configured to: in a case that a share icon is displayed, add the first information corresponding to the first content to the share directory indicated by the share icon, where the share icon is displayed floating on a display interface corresponding to the first content.

Optionally, in this embodiment of this application, the user input unit 107 is further configured to receive a third input performed on the first information in the share directory, where the first information is any one of the M pieces of information. The processor 110 is further configured to perform an editing operation on the first information in response to the third input received by the user input unit 107, where the editing operation is one of the following: adjusting an order in which the first information is arranged in the share directory, or deleting the first information.

Optionally, in this embodiment of this application, the processor 110 is configured to combine the N pieces of target information to generate a share subdirectory, where the share subdirectory includes the N pieces of target information. The radio frequency unit 101 is configured to: send the share subdirectory generated by the processor 110 to the target electronic device.

Optionally, in this embodiment of this application, in a case that the first content is content sent by a first electronic device, the user input unit 107 is further configured to receive a fourth input performed on the first content. The processor 110 is further configured to add the first content to a target favorites folder in response to the fourth input. The target favorites folder is any favorites folder in Y favorites folders in the electronic device or a new favorites folder, the Y favorites folders correspond to Y themes, and Y is a positive integer. The user input unit 107 is configured to receive the first input performed on the first content in the target favorites folder.

Optionally, in this embodiment of this application, the processor 110 is further configured to perform a target operation on the N pieces of target information in the share directory. The target operation is one of the following: removing the N pieces of target information from the share directory, or retaining the N pieces of target information in the share directory.

It should be understood that, in the embodiments of this application, the input unit 104 may include a graphics processing unit (GPU) 1041 and a microphone 1042, and the graphics processing unit 1041 processes image data of a still picture or video obtained by an image capture apparatus (such as a camera) in a video capture mode or an image capture mode. The display unit 106 may include a display panel 1061. Optionally, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application program and an operating system. An application processor and a modem processor may be integrated into the processor 110, the application processor mainly processes an operating system, a user interface, an application program, and the like, and the modem processor mainly processes wireless communication. It can be understood that, alternatively, the modem processor may not be integrated into the processor 110.

An embodiment of this application further provides a non-transitory readable storage medium. The non-transitory readable storage medium stores a program or an instruction, and when the program or the instruction is executed by a processor, processes of the foregoing content sharing method embodiment are implemented and a same technical effect can be achieved. To avoid repetition, details are not described herein again.

The processor is a processor in the electronic device in the foregoing embodiment. The non-transitory readable storage medium includes a non-transitory computer-readable storage medium, such as a non-transitory computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement processes of the foregoing content sharing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be mobile phone, a computer, a server, a network device, or the like) to perform the method described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A content sharing method, comprising:

in a case that first content is displayed, receiving a first input performed on the first content;

adding first information corresponding to the first content to a share directory in response to the first input, wherein the first information is used to indicate the first content;

receiving a second input performed on N pieces of target information in M pieces of information in the share directory, wherein the M pieces of information are used to indicate content in X display interfaces, X is a positive integer less than or equal to M, M is an integer greater than 1, and N is an integer greater than 1 and less than or equal to M; and sending target content corresponding to the N pieces of target information to a target electronic device in response to the second input;

wherein the sending target content corresponding to the N pieces of target information to a target electronic device comprises:

combining the N pieces of target information to generate a share subdirectory, wherein the share subdirectory comprises the N pieces of target information, and different information in the share subdirectory is used to indicate different pieces of page content; and sending the share subdirectory to the target electronic device.

2. The method according to claim 1, wherein the adding first information corresponding to the first content to a share directory comprises:

in a case that a share icon is displayed, adding the first information corresponding to the first content to the share directory indicated by the share icon, wherein the share icon is displayed floating on a display interface corresponding to the first content.

3. The method according to claim 1, wherein before the receiving a second input performed by a user on N pieces of target information in M pieces of information in the share directory, the method further comprises:

receiving a third input performed on the first information in the share directory, wherein the first information is any one of the M pieces of information; and performing an editing operation on the first information in response to the third input, wherein the editing operation is one of the following: adjusting an order in which the first information is arranged in the share directory, or deleting the first information.

4. The method according to claim 1, wherein in a case that the first content is content sent by a first electronic device, before the receiving a first input performed on the first content, the method further comprises:

receiving a fourth input performed on the first content; and adding the first content to a target favorites folder in response to the fourth input, wherein the target favorites folder is any favorites folder in Y favorites folders on the electronic device or a new favorites folder, the Y favorites folders correspond to Y themes, and Y is a positive integer; and the receiving a first input performed on the first content comprises:

receiving the first input performed on the first content in the target favorites folder.

5. The method according to claim 1, wherein after the sending target content corresponding to the N pieces of target information to a target electronic device in response to the second input, the method further comprises:

performing a target operation on the N pieces of target information in the share directory, wherein the target operation is one of the following: removing the N pieces of target information from the share directory, or retaining the N pieces of target information in the share directory.

6. An electronic device, comprising a processor, a memory, and a program or an instruction stored in the memory and executable on the processor, wherein the program or the instruction, when executed by the processor, causes the electronic device to perform:

in a case that first content is displayed, receiving a first input performed on the first content;

adding first information corresponding to the first content to a share directory in response to the first input, wherein the first information is used to indicate the first content;

receiving a second input performed on N pieces of target information in M pieces of information in the share directory, wherein the M pieces of information are used to indicate content in X display interfaces, X is a positive integer less than or equal to M, M is an integer greater than 1, and N is an integer greater than 1 and less than or equal to M; and sending target content corresponding to the N pieces of target information to a target electronic device in response to the second input;

wherein the sending target content corresponding to the N pieces of target information to a target electronic device comprises:

combining the N pieces of target information to generate a share subdirectory, wherein the share subdirectory comprises the N pieces of target information, and different information in the share subdirectory is used to indicate different pieces of page content; and sending the share subdirectory to the target electronic device.

7. The electronic device according to claim 6, wherein the adding first information corresponding to the first content to a share directory comprises:

in a case that a share icon is displayed, adding the first information corresponding to the first content to the share directory indicated by the share icon, wherein the share icon is displayed floating on a display interface corresponding to the first content.

8. The electronic device according to claim 6, wherein before the receiving a second input performed by a user on N pieces of target information in M pieces of information in the share directory, the program or the instruction, when executed by the processor, causes the electronic device to further perform:

receiving a third input performed on the first information in the share directory, wherein the first information is any one of the M pieces of information; and performing an editing operation on the first information in response to the third input, wherein the editing operation is one of the following: adjusting an order in which the first information is arranged in the share directory, or deleting the first information.

9. The electronic device according to claim 6, wherein in a case that the first content is content sent by a first electronic device, before the receiving a first input performed on the first content, the program or the instruction, when executed by the processor, causes the electronic device to further perform:

receiving a fourth input performed on the first content; and adding the first content to a target favorites folder in response to the fourth input, wherein the target favorites folder is any favorites folder in Y favorites folders on the electronic device or a new favorites folder, the Y favorites folders correspond to Y themes, and Y is a positive integer; and the receiving a first input performed on the first content comprises:

receiving the first input performed on the first content in the target favorites folder.

10. The electronic device according to claim 6, wherein after the sending target content corresponding to the N pieces of target information to a target electronic device in response to the second input, the program or the instruction, when executed by the processor, causes the electronic device to further perform:

performing a target operation on the N pieces of target information in the share directory, wherein the target operation is one of the following: removing the N pieces of target information from the share directory, or retaining the N pieces of target information in the share directory.

11. A non-transitory readable storage medium storing a program or an instruction, wherein the program or the instruction, when executed by a processor, causes the processor to perform:

in a case that first content is displayed, receiving a first input performed on the first content;

adding first information corresponding to the first content to a share directory in response to the first input, wherein the first information is used to indicate the first content;

receiving a second input performed on N pieces of target information in M pieces of information in the share directory, wherein the M pieces of information are used to indicate content in X display interfaces, X is a positive integer less than or equal to M, M is an integer greater than 1, and N is an integer greater than 1 and less than or equal to M; and sending target content corresponding to the N pieces of target information to a target electronic device in response to the second input;

wherein the sending target content corresponding to the N pieces of target information to a target electronic device comprises:

combining the N pieces of target information to generate a share subdirectory, wherein the share subdirectory comprises the N pieces of target information, and different information in the share subdirectory is used to indicate different pieces of page content; and sending the share subdirectory to the target electronic device.

12. The non-transitory readable storage medium according to claim 11, wherein the adding first information corresponding to the first content to a share directory comprises:

in a case that a share icon is displayed, adding the first information corresponding to the first content to the share directory indicated by the share icon, wherein the share icon is displayed floating on a display interface corresponding to the first content.

13. The non-transitory readable storage medium according to claim 11, wherein before the receiving a second input performed by a user on N pieces of target information in M pieces of information in the share directory, the program or the instruction, when executed by the processor, causes the processor to further perform:

receiving a third input performed on the first information in the share directory, wherein the first information is any one of the M pieces of information; and performing an editing operation on the first information in response to the third input, wherein the editing operation is one of the following: adjusting an order in which the first information is arranged in the share directory, or deleting the first information.

14. The non-transitory readable storage medium according to claim 11, wherein in a case that the first content is content sent by a first electronic device, before the receiving a first input performed on the first content, the program or the instruction, when executed by the processor, causes the processor to further perform:

receiving a fourth input performed on the first content; and adding the first content to a target favorites folder in response to the fourth input, wherein the target favorites folder is any favorites folder in Y favorites folders on the electronic device or a new favorites folder, the Y favorites folders correspond to Y themes, and Y is a positive integer; and the receiving a first input performed on the first content comprises:

receiving the first input performed on the first content in the target favorites folder.

15. The non-transitory readable storage medium according to claim 11, wherein after the sending target content corresponding to the N pieces of target information to a target electronic device in response to the second input, the program or the instruction, when executed by the processor, causes the processor to further perform:

performing a target operation on the N pieces of target information in the share directory, wherein the target operation is one of the following: removing the N pieces of target information from the share directory, or retaining the N pieces of target information in the share directory.

16. A chip, comprising a processor and a communications interface, wherein the communications interface is coupled to the processor, and the processor is configured to run a program or an instruction to implement the content sharing method according to claim 1.

17. A chip, comprising a processor and a communications interface, wherein the communications interface is coupled to the processor, and the processor is configured to run a program or an instruction to implement the content sharing method according to claim 2.

18. A chip, comprising a processor and a communications interface, wherein the communications interface is coupled to the processor, and the processor is configured to run a program or an instruction to implement the content sharing method according to claim 3.

19. A chip, comprising a processor and a communications interface, wherein the communications interface is coupled to the processor, and the processor is configured to run a program or an instruction to implement the content sharing method according to claim 4.

20. A chip, comprising a processor and a communications interface, wherein the communications interface is coupled to the processor, and the processor is configured to run a program or an instruction to implement the content sharing method according to claim 5.

* * * * *